3,178,296
PHOTOGRAPHIC GELATINO-SILVER HALIDE EMULSIONS CONTAINING POLYMERIC ADDENDA TO INCREASE COVERING POWER
Louis M. Minsk and David P. Brust, Rochester, N.Y., assignors to Eastman Kodak Company, Rochester, N.Y., a corporation of New Jersey
No Drawing. Filed July 27, 1961, Ser. No. 127,095
8 Claims. (Cl. 96—114)

This invention relates to photographic silver halide emulsions, and more particularly, to such emulsions containing addenda to increase the covering power of the silver.

Emulsion addenda which increase the covering power of silver in photographic emulsions are of special interest to the emulsion maker since their use results in what is equivalent to an increase in speed at a constant silver lever or to a saving in silver at a constant density level. The property of increasing covering power is very specific and few compounds have been found which possess this property.

It is an object of this invention to improve the covering power of photographic gelatino-silver halide emulsions by a novel method.

It is another object of this invention to provide novel polymeric addenda for photographic gelatino-silver halide emulsions that increase the covering power of the silver.

These and other objects of the invention are accomplished by incorporating into photographic gelatino-silver halide emulsions a copolymer of acrylic acid and an N-substituted acrylamide having the formula

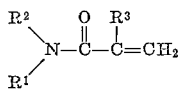

wherein $R^1$ is an alkyl radical having 1 to 4 carbon atoms or a hydrogen atom, $R^2$ is an alkyl radical having 1 to 4 carbon atoms and $R_3$ is a hydrogen atom or a methyl radical, except that when $R^1$ is a normal-butyl radical $R^2$ is an alkyl radical having 1 to 4 carbon atoms other than a normal-butyl radical. The invention does not include a copolymer of acrylic acid and N,N-di-normal-butylacrylamide.

The subject copolymers can be readily prepared in accordance with known methods. More specifically, the N-substituted acrylamide and acrylic acid are added as monomers to the polymerization reaction vessel in a polymerization solvent such as dioxane, ethanol, or the like, the reactants suitably being proportioned so that the resulting copolymer comprises about 15 to 50 percent of the acrylic acid moiety. A peroxide catalyst such as benzoyl peroxide in conventional catalytic amounts is utilized to effect the polymerization. Elevated temperatures (e.g., 90° C.) are utilized to facilitate the polymerization in accordance with usual practice. Suitable polymeric emulsion addenda of the invention are prepared to have an inherent viscosity at 25° C. in ethanol of about .1 to .6. The inherent viscosity is 2.303 times $\log_{10}$ of the relative viscosity divided by the concentration and the relative viscosity is determined by dividing the flow time of the solution by the flow time of the solvent using a concentration of 0.250 g. of the compound diluted to 100 ml. with ethanol. The copolymer addenda used with photographic gelatino-silver-halide emulsions in accordance with the invention are hydrophilic and soluble in water at pH's above about 6.

When the subject copolymers are incorporated in photographic gelatino-silver halide emulsions the covering power of the silver is substantially increased as evidenced by an increase in D max. The amount of copolymer utilized to obtain this effect can be varied, although more usually from about 15 to 40 percent by weight of the copolymer based on the gelatin is utilized.

The property of increasing the covering power of the silver in photographic emulsion is quite unpredictable, oftentimes closely related compounds exhibit substantially different covering properties. For example, copolymers of acrylamide and acrylic acid, copolymers of N,N-di-normal-butylacrylamide and acrylic acid, and copolymers of N-normal-hexylacrylamide and acrylic acid are not effective addenda for increasing the covering power of silver in photographic gelatino-silver halide emulsions, such polymeric materials being homologues of the copolymers of the invention.

The preparation of photographic silver halide emulsions such as are utilized with the addenda of the invention typically involves three separate operations: (1) emulsification and digestion of silver halide, (2) the freeing of the emulsion of excess water-soluble salts, suitably by washing with water, and (3) the second digestion or "after-ripening" to obtain increased emulsion speed or sensitivity (Mees, "The Theory of the Photographic Process," 1954). The polymeric addenda of our invention can be added to the emulsion before the final digestion or after-ripening, or they can be added immediately prior to the coating.

The addenda of the invention can be added to photographic emulsions using any of the well-known techniques in emulsion making. For example, they can be dissolved in a suitable solvent and added to the silver halide emulsion, or they can be added to the emulsion in the form of a dispersion similar to the technique used to incorporate certain types of color-forming compounds (couplers) in a photographic emulsion. Techniques of this type are described in Jelley et al. U.S. Patent 2,322,027, issued June 15, 1943, and Fierke et al. U.S. Patent 2,801,171, issued July 30, 1957. The solvent should be selected so that it has no harmful effect upon the emulsion in accordance with usual practice, and generally solvents or diluents which are miscible with water are to be preferred. Water alone is a suitable dispersing medium for the addenda of the invention. In other cases, the subject addenda can be dissolved in solvent and added to the emulsion in this form.

The emulsions of the invention can be chemically sensitized by any of the other well-known procedures. The emulsions can be digested with naturally active gelatin, or sulfur compounds can be added, such as those described in Sheppard U.S. Patent 1,574,944, issued March 2, 1926, and Sheppard et al. 1,623,499, issued April 5, 1927, and Sheppard and Brigham U.S. Patent 2,410,689, issued November 5, 1946. The emulsions can also be treated with salts of the noble metals such as ruthenium, rhodium, palladium, iridium and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951, and 2,566,263, issued August 28, 1951. The emulsions can also contain sensitizing amounts of gold salts as described in Waller et al. U.S. Patent 2,399,083, issued April 23, 1946, or stabilizing amounts of gold salts as described in Damschroder U.S. Patent 2,597,856, issued May 27, 1952, and Yutzy and Leermakers U.S. Patent 2,597,915, issued May 27, 1952. Suitable compounds are potassinum chloroaurite, potassium aurithiocyanate, potassium chloroaurate, auric trichloride and 2-aurosulfobenzothiazole methochloride. The emulsions can also contain sensitizing amounts of reducing agents such as stannous salts (Carroll U.S. Patent 2,487,850, issued November 15, 1949), polyamines, such as diethylene triamine (Lowe and Jones U.S. Patent 2,518,698, issued August 15, 1950), polyamines, such as spermine (Lowe and Allen U.S. Patent 2,521,925, issued September 12, 1950), or bis($\beta$-aminoethyl)sulfide and its water-soluble salts (Lowe and Jones U.S. Patent 2,521,926, issued September 12, 1950).

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140, issued March 22, 1938; 2,165,338, issued July 11, 1939; 2,493,747, issued January 10, 1950; and 2,739,964, issued March 27, 1956; Brooker and Keyes U.S. Patent 2,493,748, issued January 10, 1950; Sprague U.S. Patents 2,503,776, issued April 11, 1950 and 2,519,001, issued August 15, 1950; Heseltine and Brooker U.S. Patent 2,666,761, issued January 19, 1954; Heseltine U.S. Patent 2,734,900, issued February 14, 1956; Van Lare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; and triazoles of Heimbach and Kelly U.S. Patent 2,444,608, issued July 6, 1948; the azaindenes of Heimbach and Kelly U.S. Patents 2,444,605, and 2,444,606, issued July 6, 1948; Heimbach U.S. Patents 2,444,607, issued July 6, 1948 and 2,450,397, issued September 28, 1948; Heimbach and Clark U.S. Patent 2,444,609, issued July 6, 1948; Allen and Reynolds U.S. Patents 2,713,541, issued July 19, 1955 and 2,743,181 issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938; the bisquaternary salts of Allen and Wilson U.S. Patent 2,694,716, issued November 16, 1954 (e.g., decamethylene bis-benzothiazolium perchlorate, etc.), and the zinc and cadmium salts of Jones U.S. Patent 2,839,405, issued June 17, 1958.

The emulsions can also contain speed-increasing compounds of the quaternary ammonium type of Carroll U.S. Patent 2,271,623, issued February 3, 1942; Carroll and Allen U.S. Patent 2,288,226, issued June 30, 1942; and Carroll and Spence U.S. Patent 2,334,864, issued November 23, 1943; and the polyethylene glycol type of Carroll and Beach U.S. Patent 2,708,162, issued May 10, 1955.

The emulsions can contain a suitable gelatin plasticizer such as glycerin; a dihydroxy alkane such as 1,5-pentane diol as described in Milton and Murray U.S. Patent 2,960,404, issued November 15, 1960; an ester of an ethylene bis-glycolic acid such as ethylene bis(methyl glycolate) as described in Milton U.S. Patent 2,904,434, issued September 15, 1959; bis(ethoxy diethylene glycol) succinate as described in Gray U.S. Patent 2,940,854, issued June 14, 1960. The plasticizer may be added to the emulsion before or after the addition of a sensitizing dye, if used.

The emulsion can be hardened with any suitable hardener for gelatin such as formaldehyde; a halogen-substituted aliphatic acid such as mucobromic acid as described in White U.S. Patent 2,080,019, issued May 11, 1937; a compound having a plurality of acid anhydride groups such as 7,8 - diphenylbicyclo(2,2,2) - 7 - octene-2,3,5,6-tetracarboxylic dianhydride, or a dicarboxylic or a disulfonic acid chloride such as terephthaloyl chloride or naphthalene-1,5-disulfonyl chloride as described in Allen and Carroll U.S. Patents 2,725,294 and 2,725,295, both issued November 29, 1955; a cyclic 1,2-diketone such as cyclopentane-1,2-dione as described in Allen and Byers U.S. Patent 2,725,305, issued November 29, 1955; a bisester of methane-sulfonic acid such as 1,2-di-(methanesulfonoxy)ethane as described in Allen and Laakso U.S. Patent 2,726,162, issued December 6, 1955; 1,3-dihydroxymethylbenzimidazol - 2 - one as described in July, Knott and Pollak U.S. Patent 2,732,316, issued January 24, 1956; a dialdehyde or a sodium bisulfite derivative thereof, the aldehyde groups of which are separated by 2–3 carbon atoms, such as $\beta$-methylglutaraldehyde bissodium bisulfite; a bisaziridine carboxamide such as trimethylene bis(1-aziridine carboxamide) as described in Allen and Webster U.S. Patent 2,950,197, issued August 23, 1960, or 2,3-dihydroxy dioxane as described in Jeffreys U.S. Patent 2,870,013, issued January 20, 1959.

The emulsion can contain a coating aid such as saponin; a lauryl or oleoyl monoether of polyethylene glycol as described in Knox and Davis U.S. Patent 2,831,766, issued April 22, 1958; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate or a mixture of a water-soluble maleopimarate and a substituted glutamate salt as described in Knox and Fowler U.S. Patent 2,823,123, issued February 11, 1958; an alkali metal salt of a substituted amino acid such as disodium N-(carbo-p-tert. octylphenoxypentaethoxy)glutamate, or a sulfosuccinamate such as tetrasodium N-(1,2-dicarboxyethyl)-N-octadecyl sulfosuccinamate, or N-lauryl disodium sulfosuccinamate.

The addenda of the invention can be used in various kinds of photographic emulsions. In addition of being useful in orthochromatic, panchromatic, and infrared sensitive emulsions, they are also useful in X-ray and other non-optically sensitized emulsions. They can be added to the emulsion before or after any optical sensitizing dyes which may be used. Various silver salts can be used as the sensitive salt such as silver bromide, silver iodide, silver chloride, or mixed silver halides such as silver chlorobromide or silver bromoiodide. The subject addenda can be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955, or emulsions of the mixed-grain type, such as described in Carroll and Hanson U.S. Patent 2,592,243, issued April 8, 1952. The subject addenda can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

The subject addenda can also be used in emulsions intended for use in diffusion transfer processes which utilize the undeveloped silver halide in the non-image areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,608,236, issued December 28, 1954 and 2,543,181, issued February 27, 1951. They can also be used in color transfer processes which utilize the diffusion transfer of an imagewise distribution of developer, coupler or dye, from a light-sensitive layer to a second layer, while the two layers are in close proximity to one another. Color processes of this type are described in Land U.S. Patents 2,559,643, issued July 10, 1951, and 2,698,798, issued January 4, 1955; Land and Rogers Belgian Patents 554,933 and 554,934, granted August 12, 1957; International Polaroid Belgian Patents 554,212, granted July 16, 1957, and 554,935, granted August 12, 1957; and Yutzy U.S. Patent 2,756,142, issued July 24, 1956.

The above-described emulsions of the invention can be coated on a wide variety of supports in accordance with usual practice. Typical supports for photographic elements of the invention include cellulose nitrate film, cellulose acetate film, polyvinyl acetal film, polystyrene film, the presence of a peroxide catalyst in a polymerization solvent. Thereafter the resulting copolymer was precipitated by mixing with a precipitation solvent and then separated by filtration. Table A below summarizes the proportions of reactants and analysis of the copolymer products. The copolymer products are numbered in Table A and these numbers are used in the following examples for convenience of identification and reference. The N-substituted acrylamide employed can be represented by the following formula and is represented in Table A by its $R^1$, $R^2$ and $R^3$ substituents:

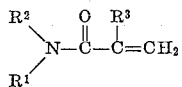

A benzoyl peroxide catalyst was utilized in all cases except in the preparation of Copolymer VII wherein a 30 percent solution of hydrogen peroxide was utilized. The reaction temperature utilized was 90° C. The inherent viscosities were determined at 25° C. in ethanol. For purposes of comparison, a copolymer of N,N-di-normal-butylacrylamide and acrylic acid, and a copolymer of N-normal-hexylacrylamide and acrylic acid were prepared.

*Table A*

| Copolymer Number | N-Substituted Acrylamide Reactant | | | | Acrylic Acid Reactant, Amount, g. |
|---|---|---|---|---|---|
| | $R^1$ | $R^2$ | $R^3$ | Amount, g. | |
| I | H | Methyl | H | 113.4 | 38.4 |
| II | Methyl | Methyl | H | 138.6 | 46.2 |
| III | H | Ethyl | H | 138.6 | 50.4 |
| IV | H | n-Propyl | H | 113.0 | 38.0 |
| V | n-Propyl | n-Propyl | H | 124.0 | 42.0 |
| VI | H | i-Propyl | H | 158.2 | 50.4 |
| VII | H | i-Propyl | H | 158.2 | 50.4 |
| VIII | i-Propyl | i-Propyl | H | 108.0 | 36.0 |
| IX | H | n-Butyl | H | 101.6 | 34.4 |
| X | H | i-Butyl | H | 100.0 | 33.4 |
| XI | H | t-Butyl | H | 159.6 | 50.4 |
| XII | H | i-Propyl | Methyl | 152.4 | 51.0 |
| XIII | Ethyl | Ethyl | H | 25.4 | 7.2 |
| XIV | n-Butyl | n-Butyl | H | 108.9 | 29.2 |
| XV | H | n-Hexyl | H | 155.9 | 52 |

| Copolymer Number | Polymerization Solvent, Amount | Catalyst Amount | Reaction Time | Precipitation Solvent | Yield, g. | Inherent Viscosity of Copolymer | Percent N in Copolymer | Percent Acrylic Acid in Copolymer |
|---|---|---|---|---|---|---|---|---|
| I | p-Dioxane, 455 ml | 1.518 g | 5 min | Acetone | 100 | 0.32 | 12.3 | 22.7 |
| II | p-Dioxane, 554.6 ml | 1.848 g | 2 hrs | do | 150 | 0.41 | 10.4 | 23.8 |
| III | p-Dioxane, 560 ml | 1.890 g | 2.33 hrs | do | 176 | 0.41 | 10.2 | 24.9 |
| IV | p-Dioxane, 453 ml | 1.510 g | 2.5 hrs | do | 135 | 0.21 | 9.0 | 24.0 |
| V | p-Dioxane, 664 ml | 1.660 g | 2.5 hrs | Pet. ether (35–60° C.) | 156 | 0.18 | 7.5 | 25.0 |
| VI | p-Dioxane, 626 ml | 2.086 g | 2 hrs | Acetone | 175 | 0.43 | 9.4 | 21.7 |
| VII | Ethanol, 560 ml.+water, 840 ml | 6.3 ml | 2.25 hrs | Acetone+diethyl ether | 141 | 0.38 | 9.17 | 24.4 |
| VIII | p-Dioxane, 432 ml | 1.440 g | 2.5 hrs | Pet. ether (35–60° C.) | 85.8 | 0.10 | 6.5 | 25.4 |
| IX | p-Dioxane, 408 ml.+ethanol, 204 ml. | 1.360 g | 2.5 hrs | Acetone | 115.8 | 0.21 | 8.0 | 24.2 |
| X | p-Dioxane, 400 ml.+ethanol, 200 ml. | 1.364 g | 2.5 hrs | do | 112.0 | 0.25 | 9.2 | 23.2 |
| XI | p-Dioxane, 630 ml.+ethanol, 210 ml. | 2.100 g | 2 hrs | Diethyl ether | 119 | 0.29 | 8.0 | 21.9 |
| XII | p-Dioxane, 814 ml | 2.034 g | 2.25 hrs | Acetone | 158 | 0.18 | 8.8 | 23.5 |
| XIII | p-Dioxane, 32.6 ml | 0.330 g | 2.25 hrs | do | 20 | 0.43 | 8.4 | 20.2 |
| XIV | p-Dioxane, 414 ml | 1.381 g | 2.25 hrs | Pet. ether (35–60° C.) | 121 | 0.18 | 8.9 | 20.2 |
| XV | p-Dioxane, 621 ml | 2.070 g | 2 hrs | Acetone | 160 | 0.41 | 6.9 | 24.0 | polyethyleneterephthalate film and related films of resinous materials, as well as glass, paper, metals and other.

The invention is further illustrated by the following examples of preferred embodiments thereof.

EXAMPLE 1

Several copolymers of the invention were prepared by refluxing acrylic acid and an N-substituted acrylamide in

EXAMPLE 2

The copolymers of the invention described in Example 1 above were tested for covering power in a high-speed, coarse-grained gelatino-silver bromoiodide (ca. 95% bromide) emulsion of the type commonly used in medical X-ray films. About 178 g. of gelatin per mole of silver halide was utilized in the emulsion. The emulsion was coated on a cellulose acetate film support at a coverage of 562 mg. of silver per square foot and exposed in the form of film strips in an Eastman Ib sensitometer at 1/25 second intervals, developed for 3 minutes at 68° F., and then fixed, washed and dried in the usual manner. Test samples containing no copolymer addenda were included for purposes of comparison. The developer utilized had essentially the following formula:

|  | G. |
|---|---|
| N-methyl-p-aminophenol sulfate | 2.2 |
| Sodium sulfite (anhydrous) | 72.0 |
| Hydroquinone | 8.8 |
| Sodium carbonate | 130.0 |
| Potassium bromide | 4.0 |
| Water to make 1 liter. | |

The results of the sensitometric tests are summarized by the data set out in Table B below wherein the speeds indicated are a function of the exposure necessary to give a density of 0.3 above background fog and expressed as a reciprocal relation to exposure, the control speed being taken as 100. The delta gamma and delta D max figures in Table B refer to the differences between the test coating and the control coating containing no copolymer.

*Table B*

| Copolymer Number | Relative Speed | Δγ | Δ D max |
|---|---|---|---|
| II | 97 | +.35 | +.16 |
| III | 129 | +.20 | >+.40 |
| IV | 112 | +.17 | +.13 |
| V | 115 | +.11 | +.07 |
| VI | 132 | +.40 | >+.40 |
| XI | 115 | +.30 | >+.40 |
| XIII | 126 | +.43 | +.22 |
| XIV | 102 | −.30 | −.24 |
| XV | 102 | −.05 | 0 |

As can be observed from the data set out in Table B, the copolymers of the invention increased the D max. or covering power of the silver in the subject emulsions. However, copolymers XIV and XV, which are not copolymers of the invention, did not exhibit such properties.

EXAMPLE 3

Several copolymers of the invention as described in Example 1 were incorporated into a slow speed gelatino-silver bromoiodide (ca. 95% bromide) of the type used in recording papers at a concentration of 100 g. of copolymer per mole of silver halide. The emulsion was then coated on a light-weight recording-type paper at a coverage of 180 mg. of silver per square foot and 290 mg. of gelatin per square foot and exposed in an Eastman Ib sensitometer at 1/25 second intervals, developed for 1 minute at 68° F., and then fixed, washed and dried in the usual manner. The developer utilized had essentially the following formula:

|  | G. |
|---|---|
| N-methyl-p-aminophenol sulfate | 3.0 |
| Sodium sulfite (anhydrous) | 45.0 |
| Hydroquinone | 12.0 |
| Sodium carbonate | 80.0 |
| Potassium bromide | 2.0 |
| Water to make 1 liter. | |

The sample coatings were then compared with a control coating containing no copolymer for percent increase in covering power. Covering power is defined as:

$$\frac{\text{Transmission density}}{\text{Grams of silver}/100 \text{ sq. cm.}}$$

The percent increases in covering power resulting from various copolymer addenda are set out in Table C below.

*Table C*

| Copolymer number: | Percent increase in covering power, percent |
|---|---|
| I | 14 |
| II | 15 |
| VI | 17 |
| VII | 12 |
| VIII | 17 |
| IX | 8 |
| X | 18 |
| XII | 19 |

The data in Table C further illustrate the increased covering power resulting when the subject copolymers are added to photographic gelatino-silver halide emulsions.

The invention has been described in detail with particular reference to preferred embodiments thereof, but it will be understood that variations and modifications can be effected within the spirit and scope of the invention as described hereinabove and as defined in the appended claims.

We claim:

1. A photographic gelatino-silver halide emulsion containing about 15 to 40 percent by weight based on the said gelatin in said emulsion of a polymeric hydrophilic composition consisting essentially of a copolymer of acrylic acid and an N-substituted acrylamide having the formula

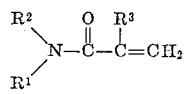

wherein $R^1$ is selected from the group consisting of an alkyl radical having 1 to 4 carbon atoms and a hydrogen atom, $R^2$ is an alkyl radical having 1 to 4 carbon atoms and $R_3$ is selected from the group consisting of a hydrogen atom and a methyl radical, except that when $R^1$ is a normal-butyl radical $R^2$ is an alkyl radical having 1 to 4 carbon atoms other than a normal-butyl radical, said acrylic acid comprising about 15 to 90 percent by weight of said copolymer.

2. A photographic gelatino-silver halide emulsion containing about 15 to 40 percent by weight based on the said gelatin in said emulsion of a polymeric hydrophilic composition consisting essentially of a copolymer of acrylic acid and an N-substituted acrylamide selected from the group consisting of N-methylacrylamide, N,N-dimethylacrylamide, N-ethylacrylamide, N-n-propylacrylamide, N,N-di-n-propylacrylamide, N-i-propylacrylamide, N,N-di-i-propylacrylamide, N-n-butylacrylamide, N-i-butylacrylamide, N-t-butylacrylamide, N-i-propylmethacrylamide and N,N-diethylacrylamide, said acrylic acid comprising about 15 to 90 percent by weight of said copolymer.

3. A photographic gelatino-silver halide emulsion containing about 15 to 40 percent by weight based on the said gelatin in said emulsion of a polymeric hydrophilic composition having an inherent viscosity at 25° C. in ethanol of about .1 to .6 and consisting essentially of a copolymer of N,N-dimethylacrylamide and acrylic acid wherein the acrylic acid comprises about 15 to 50 percent by weight of said copolymer.

4. A photographic gelatino-silver halide emulsion containing about 15 to 40 percent by weight based on the said gelatin in said emulsion of a polymeric hydrophilic composition having an inherent viscosity at 25° C. in ethanol of about .1 to .6 and consisting essentially of a copolymer of N-ethylacrylamide and acrylic acid wherein the acrylic acid comprises about 15 to 50 percent by weight of said copolymer.

5. A photographic gelatino-silver halide emulsion containing about 15 to 40 percent by weight based on the said gelatin in said emulsion of a polymeric hydrophilic composition having an inherent viscosity at 25° C. in ethanol of about .1 to .6 and consisting essentially of a copolymer of N,N-diethylacrylamide and acrylic acid wherein the acrylic acid comprises about 15 to 50 percent by weight of said copolymer.

6. A photographic gelatino-silver halide emulsion containing about 15 to 40 percent by weight based on the said gelatin in said emulsion of a polymeric hydrophilic composition having an inherent viscosity at 25° C. in ethanol of about .1 to .6 and consisting essentially of a copolymer of N-iso-propylacrylamide and acrylic acid wherein the acrylic acid comprises about 15 to 50 percent by weight of said copolymer.

7. A photographic gelatino-silver halide emulsion containing about 15 to 40 percent by weight based on the said gelatin in said emulsion of a polymeric hydrophilic composition having an inherent viscosity at 25° C. in ethanol of about .1 to .6 and consisting essentially of a copolymer of N-tertiary-butylacrylamide and acrylic acid wherein the acrylic acid comprises about 15 to 50 percent by weight of said copolymer.

8. A photographic support having coated thereon an emulsion as described in claim 1.

References Cited by the Examiner
UNITED STATES PATENTS

| | | | |
|---|---|---|---|
| 2,461,023 | 2/49 | Barnes et al. | 96—114 |
| 2,632,704 | 3/53 | Lowe et al. | 96—114 |
| 2,811,494 | 10/57 | Smith et al. | 96—114 |
| 2,835,582 | 5/58 | Fowler et al. | 96—114 |

NORMAN G. TORCHIN, *Primary Examiner.*